No. 637,989. Patented Nov. 28, 1899.
E. HANAK.
AUTOMATIC WEIGHING MACHINE.
(Application filed Mar. 14, 1899.)
(No Model.) 2 Sheets—Sheet 1.
Fig. 1.
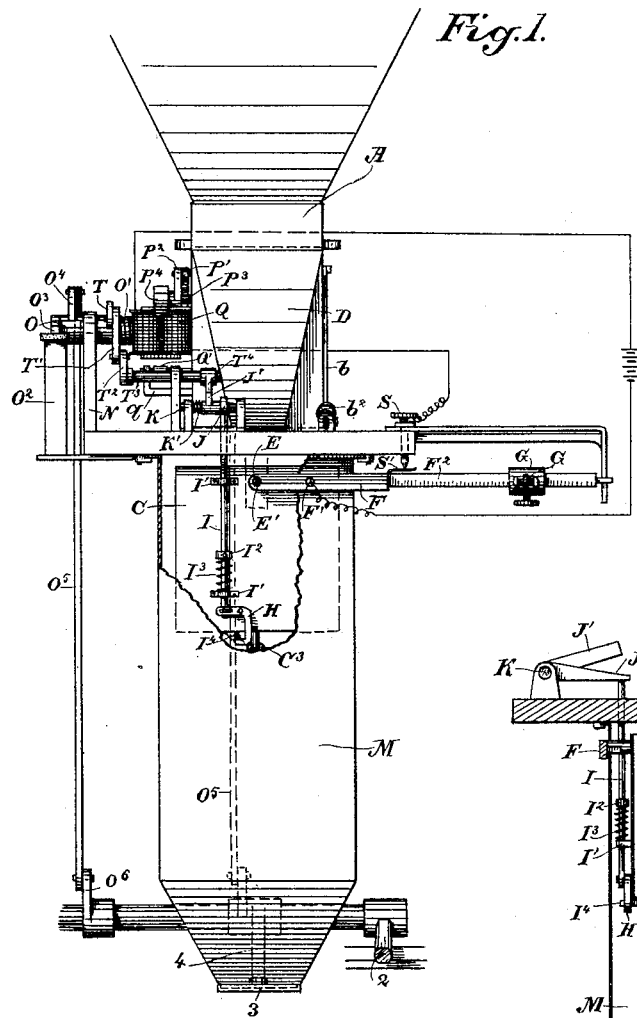
Fig. 3.
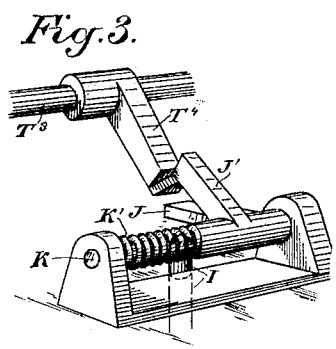
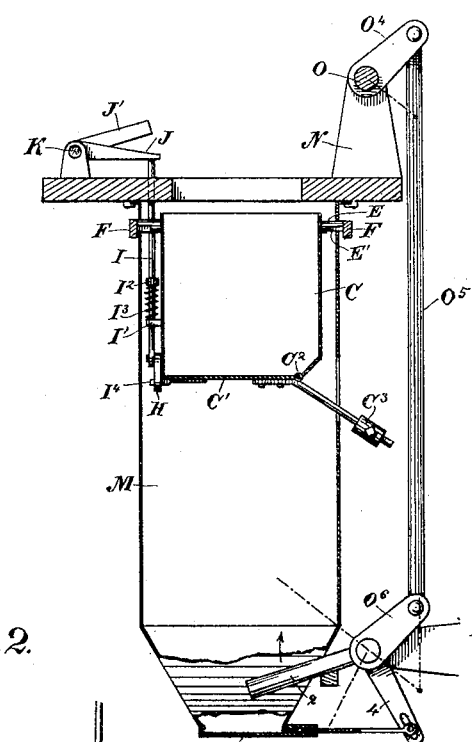
Fig. 2.
Fig. 12
Witnesses,
Inventor,
Edward Hanak
By Dewey Strong & Co.

No. 637,989. Patented Nov. 28, 1899.
E. HANAK.
AUTOMATIC WEIGHING MACHINE.
(Application filed Mar. 14, 1899.)
(No Model.) 2 Sheets—Sheet 2.
Fig. 4.
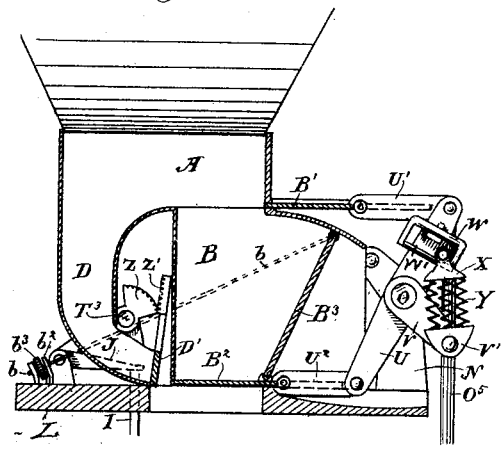
Fig. 5.
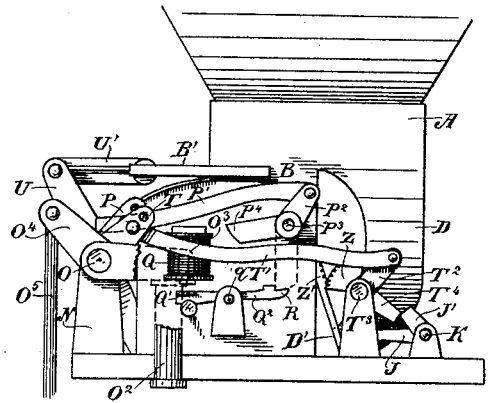
Fig. 6.
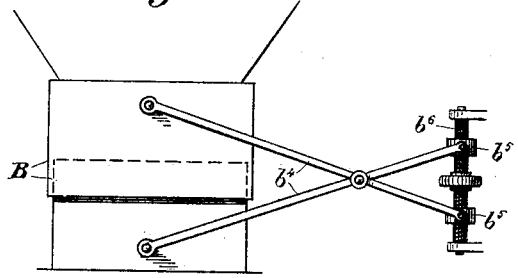
Fig. 7.
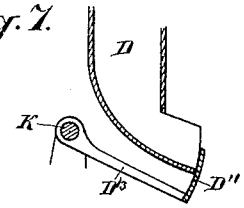
Fig. 11.
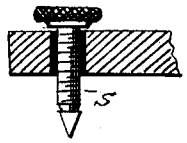
Fig. 8.
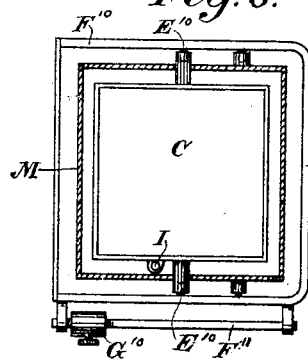
Fig. 9.
Fig. 10.
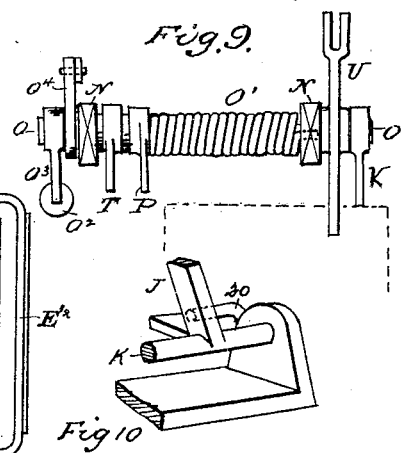
Witnesses,
Inventor,
Edward Hanak
By Dewey Strong & Co.
Attys
THE NORRIS PETERS CO., PHOTO-LITHO., WASHINGTON, D. C.

UNITED STATES PATENT OFFICE.

EDWARD HANAK, OF SAN FRANCISCO, CALIFORNIA, ASSIGNOR TO THE UNION SCALE AND MANUFACTURING COMPANY, OF SACRAMENTO, CALIFORNIA.

AUTOMATIC WEIGHING-MACHINE.

SPECIFICATION forming part of Letters Patent No. 637,989, dated November 28, 1899.

Application filed March 14, 1899. Serial No. 709,025. (No model.)

*To all whom it may concern:*

Be it known that I, EDWARD HANAK, a citizen of the United States, residing in the city and county of San Francisco, State of California, have invented an Improvement in Automatic Electromagnetic Weighing - Machines; and I hereby declare the following to be a full, clear, and exact description of the same.

My invention relates to a machine which is especially adapted to accurately weigh or measure substances such as coffee, tea, seeds, spices, and all granular and powdered substances that will flow by gravitation.

It consists essentially of a source of supply, adapted to contain any desired quantity of material which is to be weighed or packed, and, in connection therewith, of a measuring-chamber into which the material may flow by gravitation, said chamber having a means for adjustment whereby the size of the chamber may be regulated to contain a greater or less amount of material, as may be required, according to the density of the material to be measured, alternately closing and opening inlet and discharge gates above and below, a weighing-receptacle into which the material is discharged in bulk from the measuring-chamber and in quantities less than the exact amount to be weighed. In conjunction with this is a chute with controlling-gate, through which a small quantity of the material is allowed to flow, after the main portion has been delivered, until the scale upon which the weighing-receiver is suspended is tilted, a gate, and a controlling electromagnetic device, whereby said gate is instantly closed when the proper amount has been delivered into the weighing-receptacle, and connected mechanism whereby a gate at the bottom of said receptacle is opened, the contents discharged, the gate closed, and the parts returned to their normal position.

The invention also comprises details of construction which will be more fully explained by reference to the accompanying drawings, in which—

Figure 1 is a front elevation of the weighing-machine. Fig. 2 is a section through the weighing-receptacle at right angles to Fig. 1. Fig. 3 is a detail of mechanism to actuate the discharge of the receptacle. Fig. 4 is a view of the actuating mechanism. Fig. 5 shows the mechanism on the opposite side of the receiving-chamber. Fig. 6 is a modification for regulating the capacity of the receiving-chamber. Fig. 7 shows another means for operating the gate on the supplemental passage. Fig. 8 is a plan view of the weighing-receptacle and connections, showing a different form of a scale-beam. Fig. 9 is a detached plan view of the shaft O and its adjuncts. Fig. 10 is a detail showing a stop for the shaft K. Fig. 11 is a detail showing the insulated contact S. Fig. 12 is a detail showing a part of the yoke F with its centrally-located beam $F^2$.

The object of my invention is to provide an apparatus by which material which will flow by gravitation may be weighed accurately and with great rapidity.

I now describe the device as follows:

A is a hopper, receptacle, or other source of supply of any required size adapted to receive and hold the material to be weighed in bulk. Beneath this receptacle is a chamber B, having open communication at the top with the chamber A and a similar passage at the bottom delivering into the weighing-receptacle C.

$B'$ is a sliding gate suitably guided and adapted to cut off communication between the top of the chamber B and the chamber A. $B^2$ is a similar sliding gate which controls the passage at the bottom of the chamber B. When the gate $B^2$ is closed, the gate B is opened, so that the material may flow from the receptacle A into and fill the chamber B. When this has been accomplished, the position of the gates is reversed, the gate B being closed and the gate $B^2$ being opened, so that the material will fall from the chamber D into the weighing-receptacle C.

In order to measure or weigh substances having different specific gravities or varying bulk for weight, the measuring-chamber is so made that its capacity may be varied at will. As shown in Fig. 4, one side $B^3$ is hinged at the bottom, so that the upper edge is movable outward or inward to increase or decrease the capacity of the chamber. It may be adjusted and held by any suitable mechanism, of which one form is shown. This consists of a screw-rod $b$, one end of which is connected with the movable edge of the side $B^3$, and the other is slidable through guides $b^2$ and is provided with a nut $b^3$, by which it may be advanced in either direction to move the side of the chamber and change its size.

As shown in Fig. 6, the chamber B has its vertical walls made telescopic and slidable upon each other to vary the depth of the chamber.

$b^4$ are crossed arms fulcrumed at their crossing-point and having two of their divergent ends pivoted to the two parts of the chamber. The opposite ends are connected with nuts $b^5$, and a right and left threaded screw $b^6$ passes through these nuts and has a central milled head, by which it may be turned. When turned in one direction the nuts are caused to approach, and through the arms $b^4$ the sections of the chamber B are extended. When turned in the opposite direction, the chamber will be correspondingly shortened. Other equivalent mechanism may be employed, the object being in any case to vary the capacity of the chamber B. The amount thus discharged from the chamber B into the receptacle C is always less than the full amount to be weighed and the remainder is made up by the delivery through a small side passage D of such quantity as will complete the amount in the receptacle C. This passage D is controlled by a movable valve D', and the mechanism by which these valves are operated is a part of my invention.

The weighing-receptacle C has suitable arms E projecting from the center of its opposite sides near the top, and these arms rest upon the usual knife-edge supports E', which are fixed to the inner ends of the yoke or lever-arms F, which are fulcrumed at F' and have a central extension $F^2$, which forms the beam of the weighing-scale. In the present case the supports E are in the form of inverted segments; but they may be made in any usual or suitable way to form a delicate bearing and reduce the friction of the moving parts to a minimum.

The weight G is movable upon the scale-beam and may be adjusted to weigh any desired amount, being fixed at the proper point by a set-screw.

The lever-arms and scale-beam $F^2$ are united together in the form of a yoke, the arms F extending on each side of the weighing-receptacle and the beam $F^2$ projecting from the central portion of the yoke.

A modified form of a beam is illustrated in Fig. 8 and may better meet the requirements where a more compact arrangement is desired. It consists of a quadrangle $F^{10}$, surrounding the casing that is about the weighing-receptacle, and is provided with substantially fixed V-points of hardened steel, and these are fulcrumed upon segmental seats or bearings, as previously described, which are substantially fastened to the exterior casing.

$E^{10}\ E^{10}$ are the points upon which the bearings of the weighing-receptacle hang. The front of the quadrangular beam is provided with a graduated or plain beam $F^{11}$, upon which a slidable poise $G^{10}$ is mounted, similar to the preceding beam and yoke. The side of the quadrangular yoke indicated at $E^{12}$ is heavy enough to counterbalance the weighing-bucket and its fixtures.

At S', Fig. 1, is mounted a small flat spring on which is fastened a piece of flat platinum, which when the proper weight of material has been received in the weighing-bucket will bring the spring upon which the platinum is mounted in contact with a contact-pointed screw S, which is substantially fastened and electrically insulated from the casing. The screw S is provided with a platinum (or other good conducting material) point, and by this method the contact is made between platinum-equipped points and prevents corrosion. At the same time the spring forms a cushion, preventing the wear upon the platinum and insuring perfect contact to close the open leg of the circuit.

At the bottom of the weighing-receptacle C is a door C', forming a trap, hinged, as shown, at $C^2$, and having a lever-arm with an adjustable counterweight $C^3$ projecting from the hinge-joint opposite to the door C', so as to counterbalance and close it after the contents of the receptacle C have been discharged. This trap or door is retained in a closed position by means of a pivoted swinging latch H, the point of which is adapted to engage a catch $I^4$ upon the trap or door. The other end of the latch H is pivoted to the lower end of a vertically-slidable rod I, which moves in guides I'. A collar $I^2$ is adjustably fixed at any desired point on the stem I, and a spiral spring $I^3$, surrounding the stem I, has its lower end pressing upon the guide I' and its upper end against the collar $I^2$. This spring acts to normally force the rod I upward and pulling upon the latch H to cause it to engage with the catch $I^4$ and retain the trap or door in a closed position. The catch is disengaged from the latch to allow the trap or door to open, when the contents of the receptacle C are to be discharged, by the action of a lever-arm J, projecting from a spring-actuated rock-shaft K in line above the upper end of the rod or stem I, so that, the parts being set, as will be hereinafter described, with the lever-arm J extending above over the end of the rod or stem I, when by the operation of the intermediate mechanism the lever-arm J is released it is forced suddenly down and, striking on the end of the stem I, forces the latter down, temporarily compressing the spring $I^3$, and suddenly disengaging the latch H it releases the trap or door C'. This allows the trap or door to open and the contents of the receptacle C to be discharged.

The receiver A and chamber B and part of the operative mechanism are supported upon a platform L.

The weighing-receptacle C is contained and protected within an exterior casing M, which extends below the platform L, as shown. Upon this platform in suitable relation with the chamber B are the standards or supports N, in which a shaft O is journaled. This horizontal shaft has a spring coiled about it, as shown at O', one end of the spring being connected with the shaft and the other to some fixed point, and the spring is so coiled as to have a considerable tension to revolve the shaft in one direction.

$O^2$ is a pillar having an elastic buffer upon its upper end, and $O^3$ is a lever-arm fixed upon the end of the shaft O and projecting so that its outer movable end normally rests upon the cushion at the top of the pillar O, and this limits the rotary movement of the shaft in that direction as induced by the tension of the spring. The shaft O is rotated in the opposite direction by means of a crank or rocker arm $O^4$, a connecting-rod $O^5$, and a crank-arm $O^6$, with which the lower end of the rod $O^5$ is connected. This crank-arm may be actuated either by hand-lever or by a suitably-connected foot-treadle or other power connection, and its depression acting through the connected parts will rotate the shaft O against the tension of the spring. When it has thus been rotated, it carries with it a rocker-arm P, and this is connected by a rod or pitman P' with a rocker-arm $P^2$, mounted upon a short journal-shaft $P^3$, so that the shaft $P^3$ is rotated in unison with the shaft O. Projecting from this shaft $P^3$ is an arm $P^4$, and this arm serves as a latch to retain the parts in the position to which they have been moved after the release of the lever or treadle by which the movement was effected.

This latching device operates as follows: An electromagnet Q is suitably fixed with relation to the arm $P^4$ and has an armature Q', which is attracted to the magnet when the latter is energized and is moved away from the magnet when the latter is deënergized by its weight or by a suitably-constructed spring. This armature Q' has an arm $Q^2$, which is fulcrumed, as shown at $q$, so that it is turnable about its fulcrum-points to allow the armature to move toward the magnet or away from it. At the outer end of the arm $Q^2$ is a catch R, so constructed that when the arm $P^4$ has been turned by the rotation of the shaft $P^3$ into position to engage with the catch R the latter will hold it and the connected parts, as previously described. These parts will remain in this position until the magnet is energized and the armature attracted to it, and this movement of the armature will depress the catch R, disengaging it from the arm $P^4$, and the spring O', surrounding the shaft O, will then act to return all the connected parts to their normal position. In order to thus energize the magnet, I have shown the two contact-points S and S', one fixed to some stationary part of the apparatus and having one of the circuit-wires connecting with it. The other, S', is carried by the scale-beam $F^2$ or movable part, as previously described, and when the weighing-receptacle C is empty these two points are out of contact. When the weight in the receptacle is sufficient to depress it and cause the scale-beam to tilt, the point S' is brought into contact with the point S, thus completing an electrical circuit by means of a wire leading from the point S' through the electromagnet and connections and thence to the battery in the usual manner. This return movement of the shaft O when released also actuates the mechanism by which the latch H is disengaged and the gate of the weighing-receptacle is opened. This is effected by any suitable mechanism, one form of which is as follows: A rocker-arm T, mounted upon the shaft O, is connected by a rod or pitman T' with a rocker-arm $T^2$ upon a journal-shaft $T^3$. Projecting from this shaft is an arm $T^4$, the outer end of which has a beveled formation, as shown. The shaft K, previously described, which carries the arm J, which acts to disengage the latch H, is slidable longitudinally in its bearings, being normally held at one end of its movement by a spring K'. Projecting from this shaft K near the arm J is another arm J'. This arm stands in the same plane of rotation with the arm $T^4$ of the shaft $T^3$, the shaft K being prevented from revolving backwardly beyond a certain point by a suitable stop 20, (see Fig. 10,) when the arm J' will also be held in its normal position, so that when by the rotation of the shafts O and $T^3$ the arm $T^4$ is moved upwardly the inclined or beveled outer end strikes the lower side of the lever J', and by reason of this inclination it forces the lever J' to one side, the shaft K sliding and compressing the spring K' during that movement. As soon as the arm $T^4$ has risen to a point above the arm J' the latter is immediately forced back beneath the arm $T^4$ by the action of the spring K' upon the shaft K, and when in this position the lever-arm $T^4$ is in readiness to strike the arm J' whenever the armature of the electromagnet is moved to release the latch $P^4$, previously described, and which allows the shaft O to return to its normal position. This rotation of the shaft O, acting through the rocker-arms T and $T^2$ and the connecting-rod T', will rotate the shaft $T^3$ and cause the arm $T^4$ to forcibly strike the arm J', thus rotating the shaft K and causing the arm J to strike the rod I and disengage the latch H. This being done, the hinged bottom or door C' of the weighing-receptacle is free to be opened by the weight of the contained material, which instantly escapes in a body. The weighing-receptacle is then returned to its normal position by the preponderance of the scale-weight, and the contacts S S' are separated to break the electrical circuit. The arcs described by the rotation of the arms J' and $T^4$ intersect each other from opposite centers, as shown at the point of intersection of the arcs described by the arms J' and $T^4$, the lever is disengaged, and by the action of the spring K² is returned to its normal position.

The counterbalance-weight C³ of the door is sufficient to again close and latch the door C' after the weighing-receptacle is empty, and as the arm T⁴ has entirely passed the arm J' in its action thereon it does not offer any impediment to the free movement of the return of the arm J to its normal position, where, being out of contact with the presser-rod I, it offers no resistance to the operation of the latch H.

The mechanism for actuating the gates B' B² of the chamber B is as follows: Upon the shaft O is mounted a lever-arm U, which is loosely turnable upon the shaft. The upper end of this arm is connected by a link U' with the upper sliding gate B'. The lower end of the lever which is below the shaft O is similarly connected by a link U² with the lower gate B², so that when the lever is turned about the shaft one gate will be opened and the other closed.

The mechanism for operating this device so as to open and close the gates instantaneously is as follows: V is a rocker-arm fixed upon the shaft O and having a swivel device V' pivoted upon its outer end. W is a yoke or frame near the upper end of the lever-arm U and having the bar W' across the ends of the yoke, upon which a traveler X is adapted to move from one end to the other, this traveler having a roller journaled in it, which runs freely upon the bar W'. When the shaft O is in its normal position, with the stop-arm O³ resting on the pillar O², the lever-arm V stands at an angle, with the upper end inclined outwardly, as shown in Fig. 4, and the traveler X is also set at the outer end of the yoke or frame W. The traveler X and the swivel-head V' are connected by springs Y, as shown. The tension of these springs is such that when the arm V and the other parts are in the position shown the tension of these springs will retain the traveler X at the outer end of the yoke or frame W, and this tension, acting upon the lever-arm U, opens the upper gate B and closes the lower gate B², so that the chamber B will be filled from the upper receiver or holder A. When by the action of the crank, cam, or treadle the shaft O is rotated, as previously described, the arm V will be moved about in an arc of a circle below the shaft O, thus extending the springs Y, and as soon as the arm V has passed the central line of the lever-arm U taken through the shaft O the springs Y will pull upon the traveler X from the opposite side of this central line. This causes the traveler to move to the inner end of the bar W', and the pull thus being upon the opposite side of the lever U this lever will be rapidly turned upon the shaft O and instantaneously close the gate B' and open the gate B², thus allowing the contents of the chamber B to fall into the weighing-receptacle C. The quantity thus delivered is, as previously described, less than the actual amount to be weighed, and the full amount is made up by the supply from the supplemental passage D. This passage, which is controlled by the sliding gate D', is opened to allow a small stream of material to flow from the holder A into the weighing-receptacle C, when the shaft O is rotated by the pressure upon the lever or treadle. This operation may be effected in various ways, one of which is as follows: Upon the end of the shaft T³, previously described, is a toothed quadrant Z. This quadrant engages a rack Z', which is attached to or connected with the sliding gate D', and by the movement of the parts the gate D' is caused to travel until the opening through the gate is in line with the lower end of the passage D. In this position the material flowing through the passage D will fall into the weighing-receptacle C until the amount in the latter is sufficient to cause it to sink and raise the counterbalance G of the weighing-beam. This brings the contact-points S S' together, completing a circuit through the battery and electromagnet, and the electromagnet being thus energized draws the armature Q' up, correspondingly tilting the arm Q² down until the catch R has released the end of the latch P⁴. The spring O', surrounding the shaft O, is then free to exert its power and instantly return the shaft O to its normal position, in which the stop-arm O' rests upon the pillar O². This movement, acting through the rocker-arms T T², rotates the shaft T³ in the opposite direction and, through the quadrant Z and the rack Z', instantly closes the gate D' of the passage D. The return movement of the shaft O also turns the arm V to the opposite side of the central line of the lever U, and this causes the traveler X to again return along the bar W' to the outer end of the yoke or carrier W, when the pull, being upon the opposite side of the lever U, will cause it to rotate upon the shaft O and return to the normal position, in which the gate B² is closed, and the gate B' is again opened. In a modified form (shown in Fig. 7) the gate D¹¹ is moved by a lever-arm D¹³, the opposite end from the gate being fixed to the shaft by which it is oscillated to open or close the gate. The discharge end of the spout may be adjusted with relation to the gate to increase or decrease the flow, as shown. The operation may thus be continued or repeated as often as desired.

The receiver M may be fixed beneath the weighing-receptacle, so that when the contents of the latter are discharged they will pass into this receiver, which is provided with a gate 3 at the bottom. This gate remains closed until the contents of the weighing-receptacle have been discharged into the receiver. The gate is connected with a lever 4, which is actuated in unison with the lever 2, and when this latter lever is pulled down the gate will be open to discharge the contents of the receiver.

Having thus described my invention, what

I claim as new, and desire to secure by Letters Patent, is—

1. In a weighing-machine, a feeder or source of supply, a chamber supplied therefrom by gravitation with controlling inlet and outlet gates, a weighing-receptacle into which the material is delivered from said chamber in less amount than the ultimate weight desired, and a supplemental channel connecting with the supply, and discharging independently into the receptacle, with means including a rotary journal-shaft and a lever and connections for operating the inlet and outlet gates of the chamber and a second rotary shaft and connections between it and the first-named shaft, and a connection from said second shaft and controlling the discharge of the supplemental channel whereby the supply is cut off when the desired amount has been delivered to the weighing-receptacle.

2. In a weighing apparatus, a source of supply, a chamber adapted to contain a less amount than the actual weight desired, slidable gates controlling the inlet and discharge passage of said chamber, and mechanism including a rotary journal-shaft and a lever thereon having connections by which said gates are instantaneously and simultaneously actuated in opposite directions, a tilting scale-beam, a weighing-receptacle carried thereby and so disposed as to receive material discharged from the intermediate chamber, a supplemental passage connecting with the supply having a controlling-gate, mechanism including a rotary shaft connected with the first-named rotary shaft and connections between said second shaft and the controlling-gate of the supplemental passage, by which said gate is opened and material allowed to flow into the weighing-receptacle until the latter balances the counterweight of the scale-beam, and mechanism by which said gate is instantly closed when the amount in the weighing-receptacle is complete.

3. In a weighing apparatus, a source of supply, a chamber having openings at top and bottom and controlling-gates therefor, so situated that material will flow from the source of supply by gravitation, a mechanism including a rotary journal-shaft and a lever thereon having connections by which said gates are instantaneously and simultaneously reversed, a weighing-receptacle, a scale-beam by which the receptacle is carried and a counterweight therefor, a supplemental passage and controlling-gate through which the exact amount in the weighing-receptacle is made up after the main body has been delivered thereto, a second rotary shaft connected with the first-named shaft and a connection between the second shaft and the gate of the supplemental passage, an electromagnet by which the gate-operating mechanisms are actuated, contact-points whereby an electrical circuit through the magnet is completed, when the weighing-receptacle balances the counterweight and moves the scale-beam, and latches connected with the armature of the electromagnet, and disengaged by its action, whereby the movement of the controlling-gates is effected.

4. In a weighing apparatus, a source of supply, a chamber connected with said source into which material flows by gravitation, said chamber containing a less amount than that to be weighed, gates at the top and bottom of said chamber, a weighing-receptacle situated in line beneath said chamber, having a movable door or trap at the bottom and a scale-beam from which said chamber is suspended, with a counterbalance-weight adjustable upon the beam, an electrically-controlled mechanism whereby the gates of the intermediate chamber are simultaneously actuated in opposite directions to first fill said chamber and then discharge its contents into the weighing-receptacle, a supplemental passage with controlling-gate and mechanism actuated in unison with that which operates the gates of the main chamber, whereby an additional supply of material is admitted into the weighing-receptacle until the latter balances the counterweight of the scale-beam, an electromagnet and movable armature by which the actuating mechanism is released, contact-points through which an electrical circuit through the magnet is completed when the weighing-receptacle balances the counterweight and tilts the scale-beam, whereby the gate of the supplemental passage is closed, the gates of the first-named chamber are reversed, and mechanism actuated in unison therewith whereby the bottom of the weighing-receptacle is opened and its contents discharged.

5. In a weighing apparatus, a weighing-receptacle having a discharge door or trap at its bottom and means for releasing said door or trap to discharge the contents of the receptacle, an oscillatory counterweighted beam from which said receptacle is suspended, a source of supply with intermediate chambers and supplemental passage whereby the amount to be weighed is successively supplied to the weighing-receptacle, and an electromagnetic disengaging mechanism which is energized when the weighing-receptacle counterbalances the weight and tilts the beam, and mechanism intermediate therewith by which the gate of the supplemental supply-passage is closed, the gates of the main supply-chamber reversed and the discharge door or trap of the weighing-receptacle is opened.

6. In a weighing apparatus, a weighing-receptacle, an oscillatory counterweighted scale-beam from one end of which the receptacle is supported, a source of supply, a measuring-chamber intermediate between said source and the weighing-receptacle, gates movable in opposite directions by which the inlet and outlet of said measuring-chamber are alternately and simultaneously opened and closed, a mechanism for actuating said gates, consisting of a lever-arm, a shaft upon which said arm is loosely turnable, a rocker-arm fixed upon said shaft, means for turning the shaft so as to transfer the movable end of the rocker-arm to one side or other of the line of the gate-controlling lever, springs connecting the movable end of the rocker-arm with the gate-controlling lever, said springs acting upon the lever when the rocker-arm has been turned so as to transfer the pull from one side to the other of the shaft upon which the lever is turnable whereby an instantaneous movement of the lever and the gates is effected.

7. In a weighing apparatus, a measuring-chamber intermediate between the source of supply and the weighing-receptacle, transversely-slidable gates controlling the inlet and discharge openings respectively at the top and bottom of said measuring-chamber, a lever-arm loosely turnable upon a shaft having its opposite ends connected with the gates whereby the movement of the lever in either direction reverses the position of the gates, a yoke fixed to the lever-arm having a traveler movable from one end to the other thereof, a rocker-arm fixed upon the shaft upon which the lever is supported, and springs connecting the outer end of the rocker-arm with the traveler upon the lever, means for turning the shaft so as to transfer the rocker-arm to one side or the other of the axial line of the lever, whereby the tension of the springs will transfer the traveler from one end to the other of the yoke and turn the lever about the shaft so as to instantaneously reverse the position of the gates of the measuring-chamber.

8. In a weighing apparatus, a weighing-receptacle, a measuring-chamber of less capacity than the amount to be weighed interposed between the source of supply and the weighing-receptacle, gates by which the inlet and outlet passages of said chamber are controlled, a lever-arm and mechanism including a rotary shaft carrying said arm and connections between the arm and gates by which the gates are moved simultaneously in opposite directions to either fill or discharge the measuring-chamber, a supplemental passage connecting independently with the source of supply and discharging directly into the weighing-receptacle, a gate controlling said passage and mechanism including a rotary shaft and lever actuated by and in unison with that which controls the gates of the main measuring-chamber whereby a supplemental amount of material is admitted to the weighing-receptacle until the latter counterbalances the weight, and mechanism actuated by said movement of the receptacle whereby the gate of the supplemental passage is closed and the discharge door or trap of the weighing-receptacle is opened.

9. In a weighing-machine, a weighing-receptacle, a measuring-chamber intermediate between the source of supply and the weighing-receptacle, said chamber having a less capacity than the amount to be weighed, inlet and outlet gates at the top and bottom respectively of the chamber through which the material may flow by gravitation, an independent supplemental passage leading from the source of supply to the weighing-receptacle, whereby the amount to be weighed is completed after the measuring-chamber has been emptied into the weighing-receptacle, an electromagnet and an armature, contact-points and connections whereby the electromagnet is energized when the weight in the receptacle is completed and the scale-beam caused to tilt, a mechanism including a rotary shaft having a lever with connections therefrom and a second rotary shaft and lever connected with and actuated by the first-named shaft whereby the gates of the measuring-chamber and the supplemental supply-passage are actuated, means for setting said mechanism for the purpose of commencing the operation, a catch carried by the armature of the magnet and a latch which is engaged by said catch when the mechanism is set, said latch being disengaged by the movement of the armature when the electromagnet is energized whereby the mechanism is returned to its normal position.

10. In a weighing apparatus of the character described, a preliminary measuring-chamber and independent supplemental supply-passage connecting the source of supply directly with the weighing-receptacle, a rotary journal-shaft having a surrounding spring whereby it is turned in one direction, a lever and connections as shown whereby the supply and discharge gates of the measuring-chamber are actuated, and a connection whereby the gate of the supplemental passage is also actuated, an electromagnet, an armature movable when the magnet is energized, a catch carried by the armature, a latch movable to engage with said catch when the shaft is rotated to set the parts for operation, contact-points and connections whereby the completion of the weight in the weighing-receptacle and the tilting of the scale-beam energizes the magnet to move the armature and disengage the latch so that the spring returns the parts to their normal position.

11. The combination in a weighing-machine, of a counterbalanced weighing-receptacle, a source of supply, an interposed chamber of less capacity than the required weight, and gates through which it is alternately filled and discharged into the weighing-receptacle, a rotary journal-shaft and a lever thereon having connections by which said gates are simultaneously actuated in opposite directions, and a supplemental gate-controlled passage discharging into the weighing-receptacle, to complete the amount.

12. The combination in a weighing-machine of a counterbalanced weighing-receptacle movable by gravitation, a chamber of less capacity than the required weight with gates through which it is alternately filled and discharged into the weighing-receptacle, a rotary journal-shaft and a lever thereon and having connections for operating said gate in opposite directions, a supplemental gate-controlled passage discharging into the weighing-receptacle to complete the amount and mechanism by which the gate is automatically closed when the weight is complete.

13. The combination in a weighing-machine of a counterbalanced weighing-receptacle having a gate controlling its discharge and means for actuating the gate, a supplemental vessel into which the receiver discharges, a chamber of less capacity than the required weight, with gates through which it is alternately filled and discharged into the weighing-receptacle, means including a rotary journal-shaft and a lever thereon having connections whereby the gates are operated in opposite directions, a supplemental gate-controlled passage discharging into the weighing-receptacle to complete the amount, and mechanism actuated by the movement of the weighing-receptacle whereby the supply is automatically cut off when the weight is completed.

14. In a weighing-machine, a source of supply, a chamber supplied therefrom by gravitation with controlling inlet and outlet gates, means including a rotary journal-shaft and a lever thereon having connections whereby the gates are operated in opposite directions, a weighing-receptacle into which the material is delivered from said chamber in less amount than the ultimate weight desired, a gate controlling the outlet of the receptacle and a vessel into which said discharge is received, a supplemental channel connecting with the supply and discharging independently into the receiver, and an electrically-controlled mechanism energized by the completion of the weight whereby the gate of the supplemental channel is closed.

15. The combination in a weighing-machine, of a counterbalanced weighing-receptacle, a source of supply, a main and a supplemental supply chamber or passage, gates controlling said chambers or passages, a rotary journal-shaft and a lever thereon having connections whereby the gates of the main chamber are actuated in opposite directions, and means for actuating the discharge-gate of the supplemental chamber, and electrically-controlled devices actuated by the completion of the weight in the weighing-receptacle for closing the supply-gates.

16. In a weighing-machine, the combination of a counterbalanced weighing-receptacle, a source of supply, a measuring-chamber between the receptacle and supply and having a vertical wall hinged at its bottom, and means whereby the upper end of said wall is movable in and out and held in an adjusted position, gates controlling the inlet and outlet openings of the chamber and a rotary shaft having a lever with connection for operating the gates in opposite directions.

17. In a weighing apparatus, a measuring-chamber with gates at top and bottom through which it is alternately filled and discharged, a fulcrumed lever with connections between the gates and its opposite ends, springs acting upon the lever and mechanism to transfer their line of pull from one side to the other of the line of the lever to instantaneously reverse the position of the gates.

18. In a weighing apparatus, a weighing-receptacle, a measuring-chamber from which it is supplied, gates at top and bottom of said chamber through which it is alternately filled and discharged, a centrally-fulcrumed lever with connections between its opposite ends and the gates, an arm movable from one side to the other of the axial line of the lever upon one side of its fulcrum, and springs connecting the movable end of the arm with the lever upon the opposite side of its fulcrum.

19. In a weighing apparatus, a weighing-receptacle with a hinged discharge door or trap, a latch by which it is normally kept closed, a disengaging device consisting of a spring-pressed disengaging-rod, a rocker-arm upon a spring-pressed rotary shaft and mechanism actuated in unison with that which controls the supply to the weighing-receptacle whereby the rocker-arm is caused to strike the rod and release the discharge-trap after the weight is completed.

20. In an automatic weighing-machine, the combination with a scale-beam and a weighing-bucket suspended therefrom, of a spring-actuated rock-shaft, a feed cut-off operated thereby a rod connecting with the trip mechanism dependent for its release upon an electromagnet which normally prevents its operation, and a circuit controlled by the scale-beam and arranged to release the trip when closed by the movement of the beam, as set forth.

21. In an automatic weighing-machine, the combination with a scale-beam and a weighing-bucket suspended therefrom, and mechanism by which it is automatically filled and discharged as described, of a supplemental receiver into which the bucket discharges, a gate by which said receiver is closed to retain the material received from the bucket, and connections between the gate and the actuating-lever whereby the gate is opened by the movement of the lever.

In witness whereof I have hereunto set my hand.

EDWARD HANAK.

Witnesses:
  S. H. NOURSE,
  JESSIE C. BRODIE.